(12) United States Patent  (10) Patent No.: US 7,555,780 B2
Tucker et al.  (45) Date of Patent: Jun. 30, 2009

(54) INFORMATION SECURITY METHOD AND SYSTEM

(75) Inventors: David Tucker, Eight Mile Plains (AU); Matt A. Crump, Wynnum West (AU); Jerome Witmann, Eight Mile Plains (AU)

(73) Assignee: Symantec Corporation, Mountain View, CA (US)

( * ) Notice: Subject to any disclaimer, the term of this patent is extended or adjusted under 35 U.S.C. 154(b) by 982 days.

(21) Appl. No.: 11/058,166

(22) Filed: Feb. 16, 2005

(65) Prior Publication Data

US 2005/0289511 A1 Dec. 29, 2005

Related U.S. Application Data

(62) Division of application No. 09/855,073, filed on May 14, 2001, now Pat. No. 7,171,693.

(60) Provisional application No. 60/203,877, filed on May 12, 2000.

(51) Int. Cl.
 *H04L 9/32* (2006.01)
(52) U.S. Cl. .......................................... 726/26; 726/27
(58) Field of Classification Search ......... 713/164–167, 713/189–190; 726/1, 22, 26–27; 717/120, 717/124, 140–141
See application file for complete search history.

(56) References Cited

U.S. PATENT DOCUMENTS

| | | |
|---|---|---|
| 4,079,188 A | 3/1978 | Kinch, Jr. et al. |
| 4,095,046 A | 6/1978 | Frutiger et al. |
| 4,168,396 A | 9/1979 | Best |
| 4,313,031 A | 1/1982 | Widmer |
| 4,558,176 A | 12/1985 | Arnold et al. |
| 4,806,745 A | 2/1989 | Oogita |

(Continued)

FOREIGN PATENT DOCUMENTS

FR 2 693 809 7/1992

(Continued)

OTHER PUBLICATIONS

Blaze, Matt, "A Cryptographic File System for Unix," 1993, pp. 1-8, [online] Retrieved from the Internet<URL:http://citeseer.ist.psu.edu/blaze93cryptographic.html>.

(Continued)

*Primary Examiner*—Hosuk Song
(74) *Attorney, Agent, or Firm*—Fenwick & West LLP

(57) ABSTRACT

The present invention discloses an improved information security system and method. A polymorphic engine is used to enhance the security features of a software application and the data generated by or made available to the application and/or the operating system. The polymorphic engine operates to randomly alter the standard executable code of the original application while preserving its functional characteristics. Each polymorphed instance of the application differs from any other instance of the same application in form only. Various other security features operate to protect the polymorphic engine itself and/or the polymorphed code generated therefrom. These other security features include: just-in-time instruction code decryption; virtual CPU instruction code pre-processing; call mutation; stack manipulation; secure hook-capture of device input; secure display device output; application level decryption of encrypted hardware data streams; and a dynamic, randomly configured graphical keypad interface.

13 Claims, 21 Drawing Sheets

U.S. PATENT DOCUMENTS

| | | | |
|---|---|---|---|
| 5,276,314 A | 1/1994 | Martino et al. | |
| 5,428,349 A | 6/1995 | Baker | |
| 5,596,718 A | 1/1997 | Boebert et al. | |
| 5,696,822 A | 12/1997 | Nachenberg | |
| 5,748,888 A | 5/1998 | Angelo et al. | |
| 5,825,878 A | 10/1998 | Takahashi et al. | |
| 5,867,647 A | 2/1999 | Haigh et al. | |
| 5,892,899 A | 4/1999 | Aucsmith et al. | |
| 5,903,761 A | 5/1999 | Tyma | |
| 5,949,348 A | 9/1999 | Kapp et al. | |
| 5,949,882 A | 9/1999 | Angelo | |
| 5,966,450 A | 10/1999 | Hosford et al. | |
| 5,966,536 A | 10/1999 | Ravichandran | |
| 5,991,402 A | 11/1999 | Jia et al. | |
| 6,006,328 A | 12/1999 | Drake | |
| 6,009,543 A | 12/1999 | Shavit | |
| 6,052,780 A | 4/2000 | Glover | |
| 6,134,661 A | 10/2000 | Topp | |
| 6,141,698 A | 10/2000 | Krishnan et al. | |
| 6,216,183 B1 | 4/2001 | Rawlins | |
| 6,236,728 B1 | 5/2001 | Marchant | |
| 6,289,446 B1 * | 9/2001 | Nilsson | 712/244 |
| 6,480,959 B1 | 11/2002 | Granger et al. | |
| 6,587,947 B1 | 7/2003 | O'Donnell et al. | |
| 6,594,761 B1 | 7/2003 | Chow et al. | |
| 6,615,350 B1 * | 9/2003 | Schell et al. | 713/168 |
| 6,668,325 B1 | 12/2003 | Collberg et al. | |
| 6,823,460 B1 | 11/2004 | Hollander et al. | |
| 6,829,710 B1 | 12/2004 | Venkatesan et al. | |
| 7,000,119 B1 | 2/2006 | Jia et al. | |
| 2002/0027986 A1 | 3/2002 | Brekne | |
| 2005/0183072 A1 | 8/2005 | Horning et al. | |
| 2006/0053307 A1 | 3/2006 | Xu et al. | |

FOREIGN PATENT DOCUMENTS

| | | |
|---|---|---|
| WO | WO 99/01815 A1 | 1/1999 |
| WO | WO 99/30229 | 6/1999 |

OTHER PUBLICATIONS

Canadian Examination Report, Canadian Application No. 2,447,451, Jan. 29, 2008, 3 pages.

"DES Modes of Operation," Federal Information Processing Standards Publication 81, Dec. 2, 1980, pp. 1-23, [online] [Retrieved on Mar. 15, 2008] Retrieved from the Internet<URL:http://www.itl.nist.gov/fipspubs/fip81.htm>.

US 5,748,741, 05/1998, Johnson et al. (withdrawn)

* cited by examiner

| Step 315 | Checksum is calculated – modify any layer below this causes an invalid checksum to be calculated |
|---|---|
| Step 314 | The polymorphic decryption engine is started using running line – modify any layer below or above this will cause the decryption to fail |
| Step 313 | Validate the checksum calculated in step 315 – any modification will cause a checksum error |
| Step 312 | Erase the previous block – destroy above layers in memory, making rebuilding very tedious |
| Step 311 | Fill internal import table – import table in the EXE is bogus; tamper with this layer and the EXE will not work |
| Step 310 | Start running line with CRC, erase previous block, decode next block with CRC key – a single byte change in a layer above or below will destroy the next block of data |
| Step 309 | Decrypt sections of running line – running line is based on the EXE CRC; modification of any layer will cause invalid data |
| Step 308 | CRC PE header – store CRC for checking at a lower level |
| Step 307 | Install timer code to trigger a CRC check |
| Step 306 | Create import table – using layer at step 311 to determine the actual import table to be used |
| Step 305 | Decrypt resource sections – decrypt based on all layers above and below; any change will result in invalid data |
| Step 304 | Erase previous; decrypt next – delete parts of the EXE as each block is decrypted, making a full rebuild very difficult |
| Step 303 | Decode entry point and jump to it – decrypt the original entry point of the program based on all above layers; begin execution of the original program |
| Step 302 | Check for breakpoint on each API call made and delete any hardware breakpoints – stops debugging |
| Step 301 | Verify against modification every 'n' seconds – checks for debuggers; compares memory CRC with disk CRC from layer at step 315 |

FIG. 9

| Original Instruction | Replacement Options |
|---|---|
| Functional Loop | Loop |
| | dec counter / jnz |
| | dec counter / jns |
| | dec neg[counter] / jz |
| | dec / cmp / jump far |
| Zero reg | xor reg,reg |
| | sub reg,reg |
| | mov reg, 0 |
| MOV | mov reg,value |
| | zero_reg (see variations) + add reg, value |
| | zero_reg (see variations) + sub reg,value |
| load_reg – load reg 1 from [reg2] | mov reg, [Reg2] |
| | lods[b/w/d] |
| store_reg – stores reg1 to [reg2] | mov [reg2], reg1 |
| | stos[b/w/d] |
| add / sub / inc / dec | add reg, value |
| | sub reg, neg value |
| | inc reg / conditional loop |
| | dec reg / conditional loop |
| Call / jmp | Push return address JMP address |
| | Call address |

FIG. 10

| Instruction (function required) | Actual Instruction used |
|---|---|
| Mov | Randomly selected from Fig. 10 |
| Add | Randomly selected from Fig. 10 |
| Sub | Randomly selected from Fig. 10 |
| Xor | Use as is |
| Cmp | Use as is |
| Inc | Randomly selected from Fig. 10 |
| Dec | Randomly selected from Fig. 10 |
| Mov to register | Randomly selected from Fig. 10 |
| Add to register | Randomly selected from Fig. 10 |
| Sub to register | Randomly selected from Fig. 10 |
| Xor to register | Use as is |
| Cmp to register | Use as is |
| Move register to register | Randomly selected from Fig. 10 |
| Cmp register to register | Randomly selected from Fig. 10 |
| Add register to register | Randomly selected from Fig. 10 |
| Sub register to register | Use as is |
| One | Use as is |
| Jmp | Randomly selected from Fig. 10 |
| Call | Randomly selected from Fig. 10 |
| Or | Use as is |
| And | Use as is |
| Test | Use as is |

FIG. 11

| Line | Original Opcode | Mnemonics | Encrypted Opcode* | Encrypted Mnemonics | Runtime Decryption | |
|---|---|---|---|---|---|---|
| | | | | | Opcode | Mnemonics |
| 1 | 8B 06 | MOV EAX, DWORD PTR [ESI] | 98 06 | CWDE; PUSH ES | 98 06 | CWDE; PUSH ES |
| 2 | 83 F8 00 | CMP EAX, 0 | 90 F8 00 | NOP CLC | 83 F8 00 | CMP EAX, 0 |
| 3 | 74 03 | JZ LOC_1 | 67 03 | ADD EDI+3,AH | 67 03 | ADD EDI+3,AH |

*Key = 0x13

FIG. 12

| EIP | Index |
|---|---|
| 1000 | 0 |
| 14A9 | 1 |
| 1A02 | 2 |
| 280C | 3 |
| 3A10 | 1 |
| ... | ... |

FIG. 13

| Index | API |
|---|---|
| 0 | MessageBoxA* |
| 1 | CreateWindowExA |
| 2 | ExitProcess |
| 3 | WriteFile |
| ... | ... |

* These a place holders not "real" text. Also they are encrypted in this table, not plain as shown here.

FIG. 14

| EIP | API Call | Mutated API Call |
|---|---|---|
| 0x1000 | CALL [MessageBoxA] | CALL [polymorph_engine] |
| ... | ... | ... |
| 0x14A9 | CALL [CreateWindowExA] | CALL [polymorph_engine] |
| ... | ... | ... |
| 0x1A02 | JMP [ExitProcess] | CALL [polymorph_engine] |
|  | PUSH EBX |  |
|  | CALL EAX |  |
|  | ... | ... |
| 0x280C | MOV EBP, [WriteFile] | CALL [polymorph_engine] |
|  | CALL EBP |  |
|  | ... |  |
|  | CALL EBP |  |
|  | ... |  |
| 0x3A10 | CALL [CreateWindowEXA] | CALL [polymorph_engine] |

FIG. 15

| Original Code | Opcode | Replacement Code | Replacement Opcode |
|---|---|---|---|
| Call dword ptr [API] | FF 15 xx xx xx xx | Call dword ptr [polymorph_engine] | FF 25 xx xx xx xx |
| Jmp dword ptr [API] | FF 25 xx xx xx xx | Call dword ptr [polymorph_engine] | FF 25 xx xx xx xx |
| Mov eax, dword ptr [API] | A1 xx xx xx xx | Call polymorph_engine | E8 xx xx xx xx |
| Mov eax, dword ptr [API] | 8B 05 xx xx xx xx | Call polymorph_engine<br>DB X1 | E8 xx xx xx xx X1 |
| Mov ebx, dword ptr [API] | 8B 1D xx xx xx xx | Call polymorph_engine<br>DB X2 | E8 xx xx xx xx X2 |
| Mov ecx, dword ptr [API] | 8B 0D xx xx xx xx | Call polymorph_engine<br>DB X3 | E8 xx xx xx xx X3 |
| Mov edx, dword ptr [API] | 8B 15 xx xx xx xx | Call polymorph_engine<br>DB X4 | E8 xx xx xx xx X4 |
| Mov edi, dword ptr [API] | 8B 3D xx xx xx xx | Call polymorph_engine<br>DB X5 | E8 xx xx xx xx X5 |
| Mov esi, dword ptr [API] | 8B 35 xx xx xx xx | Call polymorph_engine<br>DB X6 | E8 xx xx xx xx X6 |
| Mov esp, dword ptr [API] | 8B 25 xx xx xx xx | Call polymorph_engine<br>DB X7 | E8 xx xx xx xx X7 |
| Mov ebp, dword ptr [API] | 8B 2D xx xx xx xx | Call polymorph_engine<br>DB X8 | E8 xx xx xx xx X8 |

X1 – 8 can be any of the following: EAX, EBX, ECX, EDX, ESI, EDI, EBP, ESP.

FIG. 16

INFORMATION SECURITY METHOD AND SYSTEM

CROSS REFERENCES TO RELATED APPLICATIONS

This application is a divisional of U.S. application Ser. No. 09/855,073, filed on May 14, 2001, which claims priority to U.S. Provisional Patent Application, Ser. No. 60/203,877 entitled "INFORMATION SECURITY SYSTEM" filed on May 12, 2000, which is incorporated herein by reference.

FIELD OF THE INVENTION

This invention generally relates to information security systems. More specifically, the invention relates to a system and method for improving the security features of executable computer program code and/or data which is generated, stored or manipulated by program code in order to more effectively prevent theft, decompilation, unauthorized reproduction and/or unauthorized use.

BACKGROUND OF THE INVENTION

As computers have become more widely used and more pervasively networked, information, privacy, and financial losses, etc., due to information security breaches have dramatically increased as well. According to a Mar. 12, 2001 survey press release, published by the Computer Security Institute, eighty-five percent of 538 respondents, primarily large corporations and government agencies, detected computer security breaches in the preceding year. (http://www.gocsi.com/prelea.sub-.--000321.htm, incorporated herein by reference.) Sixty-four percent of the same respondents confirmed financial losses due to computer breaches, with thirty-five percent of 186 respondents being capable of quantifying their losses as totaling $377,828,700. By comparison, the losses from 249 respondents in 2000 totalled $265,589,940, with the average annual total over the prior three year period being $120,240,180. This trend illustrates that the threat of computer crime and other electronic information security breaches continues to grow with financial loss exposure also increasing.

As in previous years, the most serious financial losses have occurred from theft of information (34 respondents reporting $151,230,100) and fraud (21 respondents reporting $92,935,500). Notably, those respondents that cited their Internet connections as a frequent point of attack rose from 59% in 2000 to 70% in 2001. Some examples of security breaches and cyber crimes on the rise are: system penetration from external sources (40% of respondents); denial of service attacks (38%); employee abuse of Internet access privileges, for example downloading pirated software or inappropriate use of email systems (91%); and computer virus attacks (94%).

Many advances have been made in recent years in the field of computer information security. Most of these security countermeasure technologies have employed computer software to: identify authorized users of a system; protect against virus infection; encrypt/decrypt data streams; prevent unauthorized registration and/or use of pirated software applications; and block malicious or surreptitious communications originating from a particular source. Unauthorized access to a particular computer system, however, may often be obtained by exploiting various security flaws present in the program code of the countermeasure software itself. Additionally, unauthorized access may also occur with the theft of user identification and password information.

With respect to the unauthorized and illegal reproduction of computer software, one of the most prevalent problems is that the software applications can be reverse engineered with decompiling tools. Decompilers are essentially software applications that examine other compiled software applications in order to reconstruct the original source code. For commercial software applications offered for sale, decompilation and reverse engineering is often prohibited by software license agreements. Decompilers, however, are freely available for a variety of platforms. Generally, a decompiler works by analyzing the byte code of software and making educated guesses about the source code that created it. Most decompilers also provide additional debugging information, which can help the decompiler generate a more accurate representation of the original source code. If the software employs code routines for protecting itself against unauthorized use, such as with the aid of serial numbers, hardware locks, locking to floppy disks or CD's, time-limited license expiration, etc., the code fragments can be decompiled, analyzed, modified and recompiled to produce a new version of the software application in which the security code routine has been defeated and is no longer capable of preventing unauthorized use. The modified software application is thereafter unprotected and may be duplicated and distributed ad infinitum for illegal, royalty-free use, for example, over the internet as what is known to those skilled in the art of software piracy as "warez".

Several debugging tools, such as, for example, NUMEGA-.RTM. SOFTICE.RTM., are readily available for this purpose. (http://www.numega.com/drivercentral/components/si_driver.shtml). A debugging tool, more commonly known as a "debugger", is a software development program that allows the user to debug and troubleshoot computer code as the application is being developed. Generally, the debugger acts to interrupt the CPU in order to watch each individual instruction as it arrives for processing and execution. For example, a debugger may be used to analyze and determine precisely which code fragment in a compiled application is responsible for interrogating whether a valid serial number has been provided in order to permit an authorized user to execute the program application. Once the serial number interrogation code fragment is located by the debugger, it becomes rather simple to decompile the code fragment to determine the characteristics that a valid serial number key must have in order to permit program execution access. For example, for any serial number interrogation code fragment and any valid serial number, the operation of the code fragment on a valid serial number s permits user access (1=True; therefore, allow access) as given by: s=1 and the operation of the interrogation code fragment on an invalid serial number x denies user access (0=False; therefore, deny access) as given by: x=0. Given the code fragment, an inverse function $.^{-1}$ may be derived such that: $1iC^{\wedge}-1Ri=isii=1nC^{\wedge}si=n$, wherein, any operation of the inverse function $.^{-1}$ upon a random seed $R_{.sub.i}$ generates a random and valid serial number $s_{.sub.i}$. Moreover, an algorithm may be deduced from the inverse function of the code fragment $.^{-1}$ to generate a stand-alone application capable of generating multiple random, yet valid, serial numbers. Alternatively, the interrogation code fragment may be removed altogether and the program recompiled to a version which no longer has an interrogation code routine and that looks for a serial number prior to permitting the user to execute the application.

Another representative software security weakness involves the MICROSOFT.RTM. WINDOWS.RTM. Application Programming Interface (API). For example, when the user displays a webpage requesting that the user login, there may be a textbox provided for the username and another textbox for the password. Using the WINDOWS.RTM. API, another application can continuously or periodically request the contents of the textboxes, even if the webpage display subroutine passes asterisk characters to obscure that content. Such an application can be designed to run in the background and would be generally undetectable to the average user.

Yet another exploitable software security vulnerability involves the logging of user keystrokes. In these types of breaches, an application can monitor the data originating from the operating system's keyboard device driver routines to look for username, password or other sensitive data and store and/or transmit the data for future use. Additionally, keyboards, like most electronic devices, generally emit electromagnetic radiation of particular frequencies which propagate away from the keyboard in all directions. Someone monitoring these frequencies at a distance can analyze the signals to determine which keys on the keyboard have been depressed.

The "cut and paste" feature of many operating systems also presents a security problem. Each time the cut-and-paste feature is used, for example, in MICROSOFT.RTM. WINDOWS.RTM., another application can interrogate the clipboard and make copies of the contents. There are many other examples of exploiting software security flaws that involve other mechanisms, such as digital wallets/passports, web browser cookies, etc. Often, a computer virus is selected as a transport mechanism for depositing these malicious applications onto a target computer system.

There is a need, therefore, within the electronic information security art, to more effectively counter the exploitation of security flaws in software applications during the execution of the application code. There is also a need to more effectively prevent (1) unauthorized duplication and distribution of software applications and (2) the capturing of identification, password and/or other data that might be used, inter alia, to gain access to a particular computer system.

SUMMARY OF THE INVENTION

In general, the present invention suitably protects standard and/or custom compiled code using a polymorphic engine which randomly alters the executable code of a compiled application while conserving the application's original operational and functional characteristics. Once the code has been randomly polymorphed, it becomes statistically impossible to retrieve the original application source code. Additionally, each polymorphed copy of the application randomly differs from any other copy and, therefore, precludes the possibility of generating a patch or crack for any one polymorphed copy that will work generically with any other polymorphed copy of the application. Moreover, the code polymorphing process can be iteratively applied to generate multiple layers of protection.

In order to protect the polymorphic engine from debugging, decompilation and/or reverse engineering by analysis of memory snap-shots, a running line encryption method, is also disclosed, which protects the polymorphic engine while the engine's code resides in memory. This is generally accomplished by having only one line of the engine's encrypted instruction code decrypted for any given CPU instruction cycle. As the polymorphic engine's code moves through the stack to be processed by the CPU, these instructions are decrypted "just-in-time" and provided to the CPU for execution, and then immediately re-encrypted before decryption and subsequent execution of the next line of instruction code. The present invention also discloses a virtual CPU instruction set pre-processor employing a matchable data structure that is randomly created when the polymorphed application initializes. The matchable data structure correlates instructions specific to the CPU's instruction set with virtual CPU opcodes generated by the polymorphic engine.

As an added layer of protection, the present invention also discloses stack manipulation and call mutation features that operates with the polymorphic engine to further subvert attempts to analyze and reverse engineer the application code. For applications or operating systems that use member calls to classes where the calls contain certain header data required by the class member to function properly, the call mutation feature operates as an execution sequence redirector by: (1) inserting mischievous data into the header of the original call, thereby rendering the original call ineffective; (2) rerouting the original call to a substitute call in which the substitute routine queries the stack pointer to determine where the substitute routine has been called from; and (3) comparing the data obtained from the stack to a matchable data structure in order to pass program execution control to the appropriate routine. The software application still includes similar or identical functionality, but the header of the original call is different and not readily traceable. This process can be iteratively applied to generate multiple layers of protection and may also be applied to API or other pointers as well.

A secure output display interface for concealing data, protects users from applications that may use operating system calls to capture data by placing a hook into OS routines that preprocess input, (i.e., from a keyboard, mouse, light pen, etc.) and by interpreting the input before it is made available to other OS processes. The hook-captured input is then enciphered and hidden from the OS. For example, a user password entered in a textbox could be hook-captured from the keyboard device driver, enciphered and stored, and then the hook routine passes literal asterisk characters to the appropriate textbox. In such a system, queries from other OS routines to the textbox object would return the series of asterisks characters placed there by the hook routine and not the literal text of, for example, a password entered by the user. In one of the various aspects of the present invention, the hook-capture routine helps to secure user input to the polymorphed application by modifying display device output as well as corresponding literal data object content.

Another security feature of the present invention involves a secure hardware input device driver interface (i.e., keyboard, mouse, light pen, Ethernet cards, etc.) for entering secure data content. In one aspect of the present invention, the polymorphed application communicates with an encryption chip located within the user input device to notify the device when encrypted communication is desired. All other communication with the input device, in the absence of a request for encrypted data traffic, will be unencrypted. Encrypted data streams from the input device are decrypted at the polymorphed code application level, not the hardware or OS level, in order to prevent background applications from obtaining the decrypted data stream.

In yet another embodiment of the present invention, a secure software application for entering authentication information (i.e., username and password data, etc.) is described. The authentication application is a dynamic, randomly configured, graphical keypad display, which is designed to subvert optical capture/recognition and hardware input device logging.

BRIEF DESCRIPTION OF EXEMPLARY DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views and:

FIG. 9 is a schematic diagram depicting an exemplary system and method for securely executing application code in accordance with another aspect of the present invention.

FIG. 10 is a table depicting an exemplary set of candidate instructions which lend themselves to substitution with functionally isomorphic instructions in accordance with another aspect of the present invention.

FIG. 11 is a table depicting exemplary benign instructions for insertion into polymorphed code in accordance with another aspect of the present invention.

FIG. 12 is a table depicting an exemplary process that utilizes running line encryption in accordance with another aspect of the present invention FIG. 13 depicts an exemplary EIP look-up table in accordance with another aspect of the present invention.

FIG. 14 depicts an exemplary import address table having an indexed, encrypted list of the original API place holders in accordance with another aspect of the present invention.

FIG. 15 is a table depicting an exemplary correlation chart for mutation of API calls in accordance with another aspect of the present invention.

FIG. 16 is a table depicting an exemplary method for mutation of API calls using the INTEL.RTM. instruction set in accordance with another aspect of the present invention.

Other aspects and features of the present invention will be more fully apparent from the detailed description that follows.

DETAILED DESCRIPTION OF EXEMPLARY EMBODIMENTS

The present invention offers substantial advantages and improvements over existing electronic information security technology with respect to the security features of executable application code and/or data which is generated, stored or manipulated by the application code in order to more effectively prevent unauthorized reproduction, access and/or use of the same. In accordance with various exemplary embodiments disclosed herein, the present invention operates to protect standard or custom compiled code using a polymorphic engine which randomly alters the standard executable code of a compiled application while conserving the application's original operational and functional characteristics. Other methods and systems for protecting data traffic to and from the polymorphed application and the polymorphic engine itself are also described.

The following descriptions are of exemplary embodiments of the invention only, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention.

Figure 1:
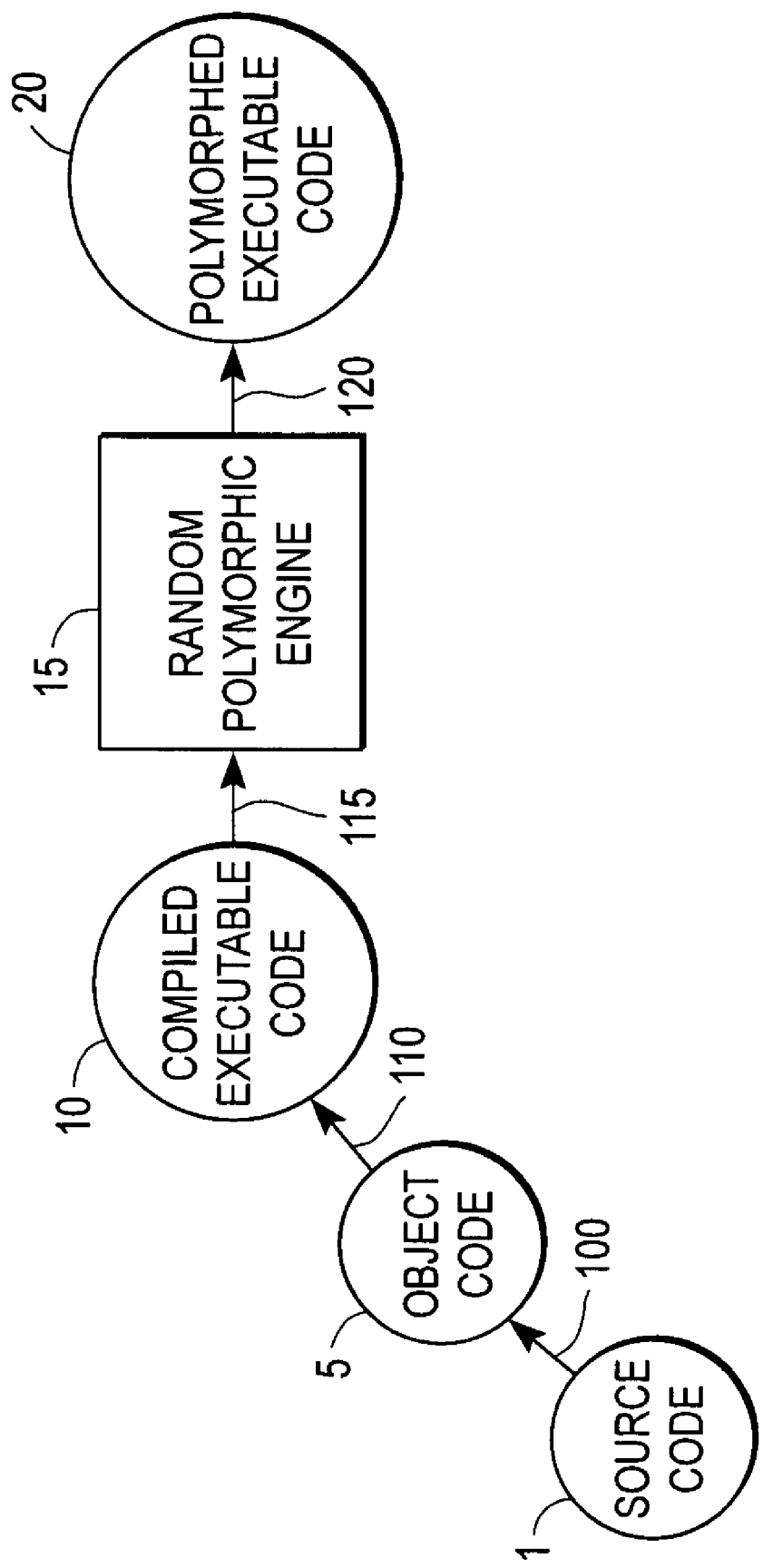
FIG. 1 is a schematic diagram of exemplary steps for generating a code polymorph in accordance with one aspect of the present invention.

FIG. 1 depicts an exemplary method and system for modifying compiled executable application code 10 employing a polymorphic algorithm 15 to generate an executable code polymorph 20. Source code 1 is compiled (step 100) to object code 5 and thereafter linked (step 110) to generate a compiled executable program 10. In an alternative exemplary embodiment, source code 1 may be more directly converted to executable program code 10 without generating and linking object code 5, such as in the case of the source code 1 being authored in an interpreted language such as, for example, XML, DHTML, Basic, LISP, Java, Visual Basic, Install Shield, various scripting languages and/or any programming or mark-up language or combination of languages, now known or later derived by those skilled in the art, employing the use of non-CPU and/or non-native code. A random polymorphic engine 15 scans the code (step 115) of the compiled executable 10 to look for predetermined candidate instructions to be replaced with random functionally isomorphic instructions. In one exemplary embodiment, this may be accomplished by randomly selecting an entry in an instruction look-up table. Such a look-up table might comprise, for example, four different options for accomplishing the result of adding two numbers together using the instruction set of a particular CPU. FIG. 10 depicts a set of exemplary candidate instructions in accordance with, for example, a representative subset of INTEL.RTM. instruction codes which lend themselves to substitution with multiple functionally isomorphic replacement options. Those skilled in the art will appreciate that the present invention may be applied to a variety of CPU architectures employing various instruction sets now known or hereafter derived.

In an alternative exemplary embodiment of the present invention, benign instructions may also be inserted into the polymorph instruction code 20 to further differentiate the polymorph 20 from the original compiled executable 10 without altering the functional operation of the polymorphed code 20. Generally, a benign function is an instruction, or a set of instructions, whose operation is inconsequential to the overall operation, function or result of the remainder of the application code. FIG. 11 depicts exemplary benign instructions wherein, where possible, an alternative instruction is selected randomly to replace a functionally benign instruction.

Once the isomorphic instructions have been substituted for original instructions (step 120), the resulting code polymorph 20 is physically different from the original compiled executable 10, yet has substantially the same operational and functional characteristics. The process, shown in FIG. 1, of generating a code polymorph may be more concisely represented by the following: $.PSI.=o$ where represents the original compiled executable 10, .PSI. represents the set of data, parameters and/or variables operated on by, and o represents the result generated by execution of the original compiled code 10. The polymorphic algorithm 15 operates to perform a substantially unitary transformation of the original compiled code 10 to generate a functionally isomorphic code polymorph 20 as in the following:

$$\{\text{circumflex over }(X)\}(.PSI.)=\{\text{circumflex over }(X)\}*.PSI.=o$$

where $\{\text{circumflex over }(X)\}$ represents the polymorphic algorithm 15 whose action on the originally compiled executable code 10 ( ) generates a code polymorph 20 ($\{\text{circumflex over }(X)\}*$), which when applied to the set of data, parameters and/or variables (.PSI.) typically operated on by the originally compiled code 10 ( ) produces substantially the same functional result o. Therefore, the unitary transformation performed by the polymorphic algorithm 15 ($\{\text{circumflex over }(X)\}$) on the originally compiled code 10 ( ) may also be represented by: $.\text{therefore}.\{\text{circumflex over }(X)\}(.PSI.)=.PSI.$ where the operation of the polymorphic algorithm 15 ($\{\text{circumflex over }(X)\}$) may be more simply considered as any representative or exemplary unitary transformation, such as, for example, multiplication of a particular value by the quantity 1. In the present invention, however, the polymorphic engine 15 is not considered to be merely limited to performing mathematically unitary transformations of the original compiled code 10, but also functionally unitary transformation of individual and/or blocks of CPU instructions themselves. Therefore, the generated code polymorph 20 ($\{\text{circumflex over }(X)\}*$) is said to constitute a functionally isomorphic variant of the originally compiled code 10 ( ) having the property, inter alia, of being statistically impossible to reverse engineer in attempts to regenerate the original code 10.

Figure 2:
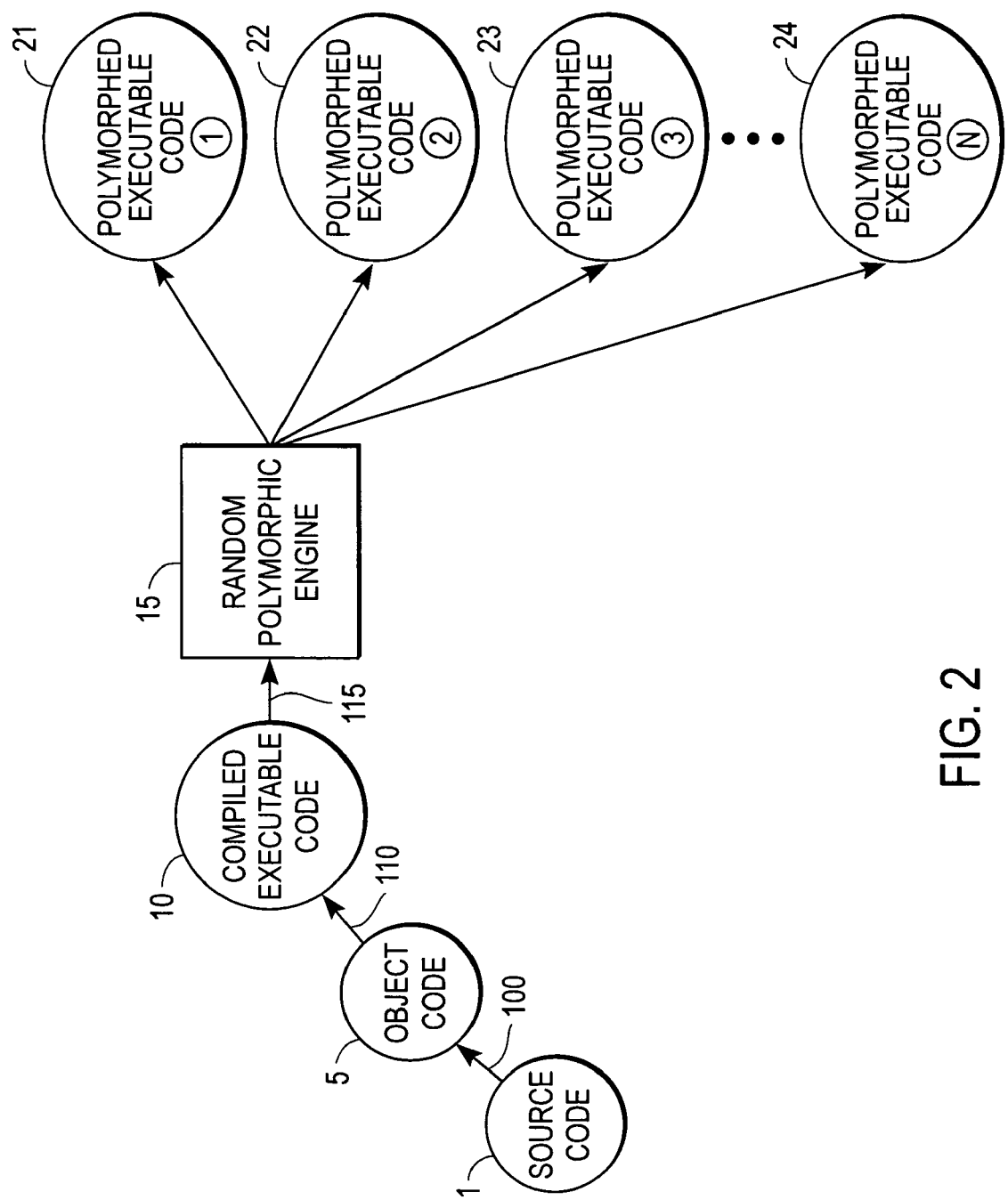
FIG. 2 is a schematic diagram demonstrating an exemplary generation of multiple code polymorphs from a compiled executable program in accordance with another aspect of the present invention.

The polymorphic engine 15, in one exemplary embodiment of the present invention, is configured to randomly scan, select, assign and/or substitute isomorphic code fragments that are functionally correlated to substantially reproduce any particular operations, or set of operations, that may be found in the original executable code 10. This may be accomplished by comparing original instruction codes that are candidates for isomorphic substitution with multiple functional isomorphs of which at least one will be randomly selected for actual substitution into the generated polymorphed code 20. In other words, for each discrete operation of the polymorphic engine 15 as it is applied to the original compiled code 10, a different code polymorph 20 version of the original program 10 is generated which has physically different instructions, but substantially the same functional characteristics of any other code polymorph 20. This relationship among multiple code polymorphs 21-24 is depicted in FIG. 2, wherein no two code polymorphs contain physically identical code, but all of the code polymorphs 21-24 operate to produce substantially the same functional result. This relationship may be represented by the following:

$$2i=1nX\hat{}O\hat{}=X\hat{}1*+X\hat{}2*+X\hat{}3*+X\hat{}n*$$

wherein, multiple application of the polymorphic algorithm 15 ($\{\text{circumflex over }(X)\}$) to the original compiled code 10 ( ) generates a series of code polymorphs 21-24 ($\{\text{circumflex over }(X)\}*.\text{sub.i}$). These code polymorphs 21-24 ($\{\text{circumflex over }(X)\}*.\text{sub.i}$) have the relationship of $\{\text{circumflex over }(X)\}*.\text{sub.i}.\text{noteq}.\{\text{circumflex over }(X)\}*.\text{sub.j}$, which is to say that no two code polymorphs are statistically physically identical to each other. However, the code polymorphs 21-24 ($\{\text{circumflex over }(X)\}*.\text{sub.i}$) also have the relationship of $3i=1nX\hat{}i*=n(o)$.

As such, they operate to substantially produce the same functional result when applied to the set of data, parameters and/or variables (.PSI.) typically operated on by the originally compiled code 10 ( ).

Figure 3:
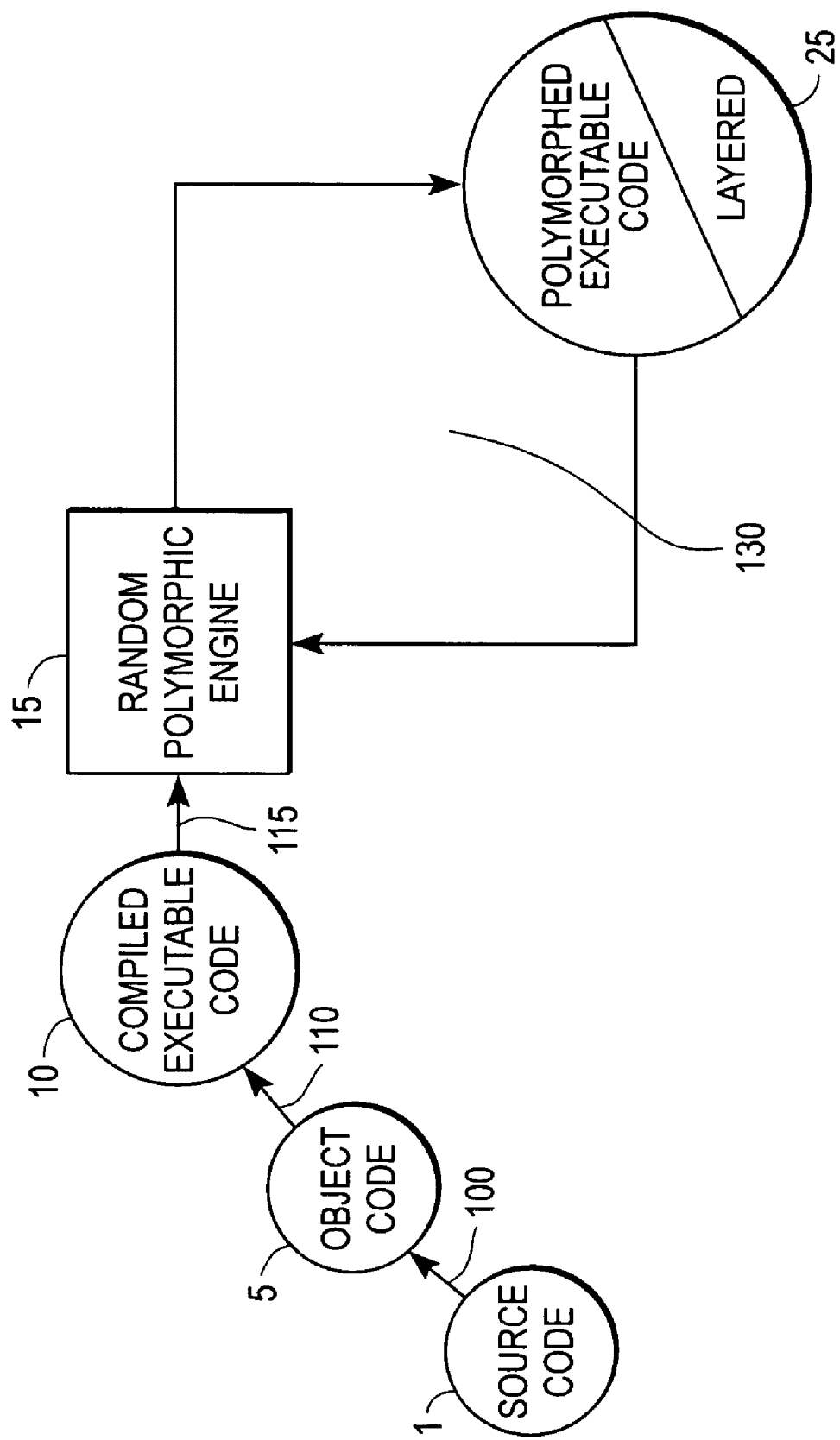
FIG. 3 is a schematic diagram depicting an exemplary generation of a layered code polymorph with the iterative application of the polymorphic algorithm to the code polymorph produced therefrom in accordance with another aspect of the present invention.

Once the code has been randomly polymorphed, it becomes statistically impossible to retrieve the original application source code. Additionally, each polymorphed copy 21-24 of the application randomly differs from any other copy, precluding the possibility of generating a patch or crack for any one polymorphed copy that will work generically with any other polymorphed copy of the application. Moreover, in an alternative exemplary embodiment, the code polymorphing process may be iteratively applied to generate multiple layers of protection by looping the generated code polymorph back through the polymorphic engine as depicted in FIG. 3, such that a layered code polymorph 25 is produced.

Figure 20:
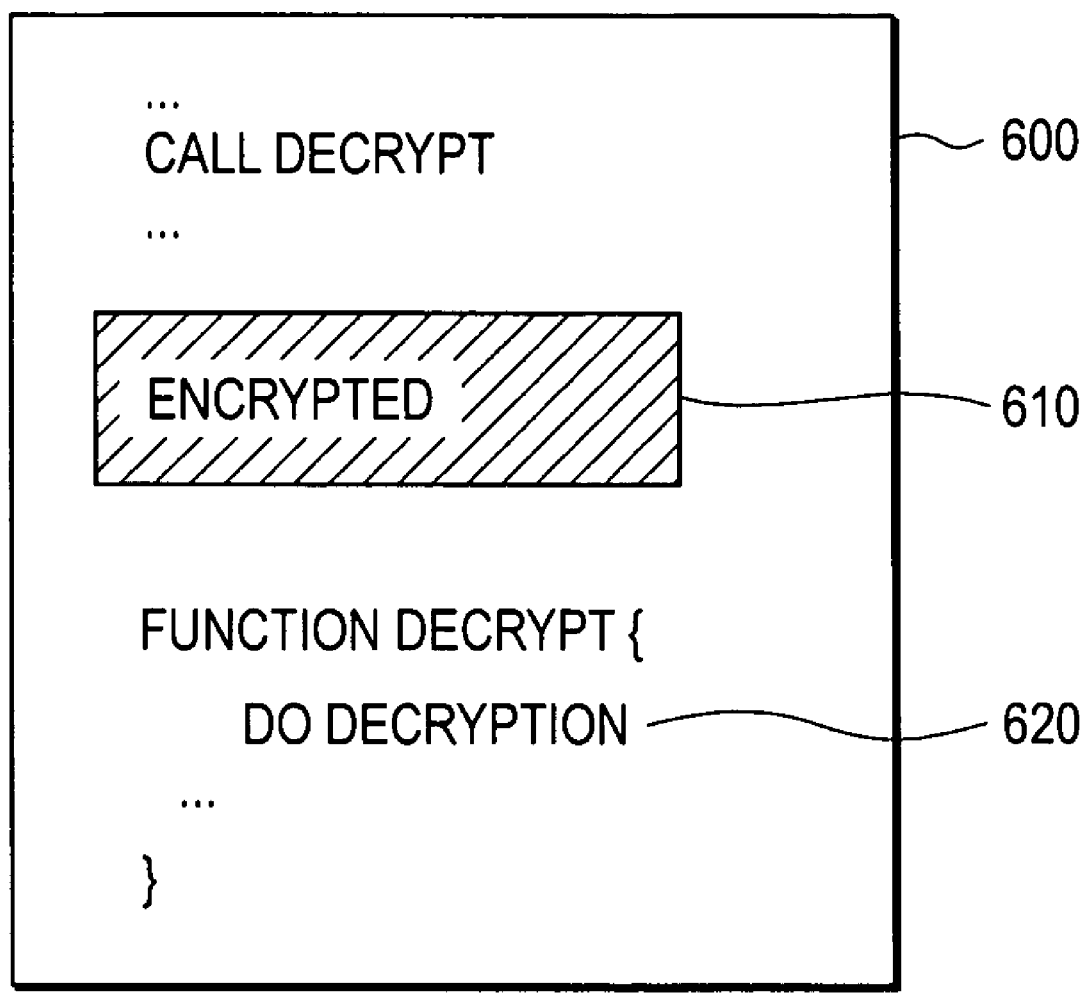
FIG. 20 is an exemplary schematic diagram depicting a prior art system and method for encrypting compiled program code.
Figure 21:
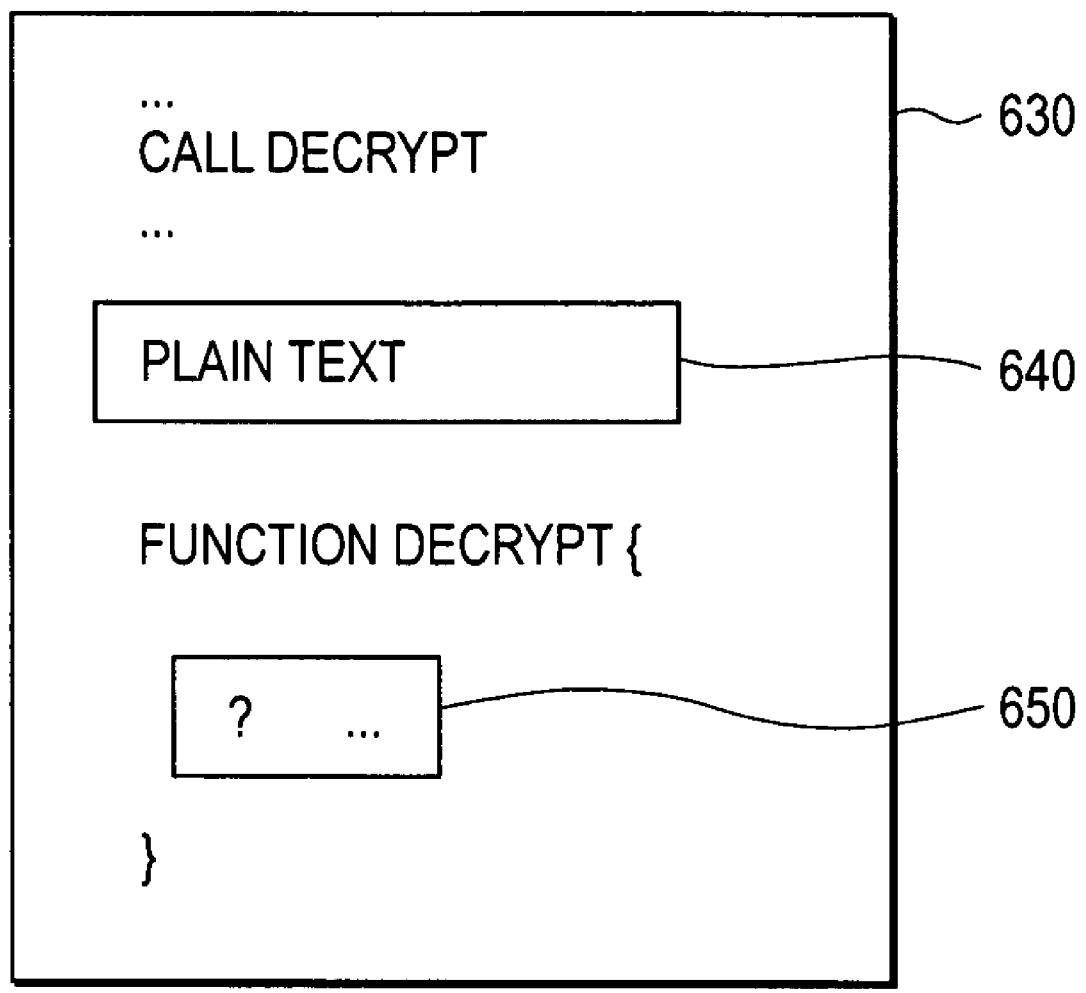
FIG. 21 is a schematic diagram depicting an exemplary system and method for protecting compiled code using a random encryption/decryption process in accordance with another aspect of the present invention.

In one exemplary aspect, the method for processing 120 executable code 10 to generate a polymorphed code variant 20 may be thought of as "wrapping" or "applying a wrapper to" the original executable. In another exemplary embodiment, wrapping 120 of the polymorphed code additionally enciphers the polymorph 20 to further subvert attempts to reverse engineer the application. FIG. 20 shows a generic prior art process for encrypting/decrypting 620 the code 610 of an at least partially encrypted program 600. As the prior art program 600 is compiled, the decryption algorithm 620 is generally both known and stored in the executable application code; therefore, the encrypted code block 610 can be directly added at the compiling stage. However, in accordance with an exemplary aspect of one embodiment of the present invention, as shown in FIG. 21, a random cipher algorithm 650 is generated during the wrap process 120 to encrypt the code 640 of the protected application 630. This random cipher algorithm 650 is generated in situ and, therefore, generally not known or available to the polymorphic engine 15 during the wrapping process. Because the cipher algorithm 650 is not known at the time of wrapping, the newly created random cipher algorithm 650 must be executed in order to correctly determine the result to apply to subsequent layers for providing additional encryption of the code segment 640. The random cipher algorithm 650, in an exemplary embodiment of the present invention, is mathematically symmetric such that the inverse of the algorithm decrypts the enciphered block.

Generally, the ability of polymorphed code variants to remain securely protected will be at least partially dependent on the ability of the polymorphic application to resist hacking and/or cracking attacks. In order to protect the polymorphic engine 15 itself from debugging, decompilation and/or reverse engineering by, inter alia, analysis of memory snapshots, a running line encryption method may also be employed. In an exemplary embodiment of the present invention, running line encryption operates to protect the polymorphic engine 15 while the engine's code resides in memory. This is generally accomplished by (1) encrypting the polymorphic algorithm's compiled instruction code, (2) having only one line of the engine's encrypted instruction code decrypted for any given CPU instruction cycle, and (3) re-encrypting the instruction code after the instruction has been executed. As program execution flow moves the polymorphic engine's code through the stack to be processed by the CPU, these instructions are decrypted just-in-time to be provided to the CPU for execution, and then immediately re-encrypted before the decryption and subsequent execution of the next line of instruction code.

In one exemplary embodiment of the present invention, the running line encryption encoding process proceeds by: (1) calculating the original opcode length; (2) exclusive or'ing (XOR) the first byte of the opcode using a key generated by a random number generation routine (RNG); (3) employing an encryption algorithm to encipher the first byte of the opcode; and (4) sequentially stepping through the original opcode to repeat steps (1)-(3) on subsequent instructions. It will generally be understood by those skilled in the art that any encryption algorithm, including, but not limited to, RSL, public/private key encryption, etc. now known or hereafter derived by those skilled in the art, may be used to encipher the opcode at step (3). The runtime decoding operation of the running line encryption process, in one exemplary embodiment, proceeds by: (A) decrypting the first byte of enciphered instruction; (B) providing the decoded instruction to the CPU for processing; (C) re-encrypting the first byte of the instruction after processing; and (D) sequentially stepping through the encrypted instruction code to repeat steps (A)-(C) to execute the enciphered program.

FIG. 12 depicts an exemplary process that utilizes the disclosed running line encryption feature according to one embodiment of the present invention. Line 1 is a line of instruction code that has already been provided to the CPU for execution and subsequently re-encrypted. Line 2 represents an instruction that is currently decrypted and running. Line 3 shows a line of instruction code that will subsequently be decrypted and executed after execution and re-encryption of Line 2 has been completed.

In another exemplary embodiment, the present invention also includes a virtual CPU instruction set pre-processor that uses a matchable data structure, which is randomly created when the polymorphed application initializes. The matchable data structure may comprise, for example, a look-up table, a database, a symmetrical correlation algorithm, an asymmetric correlation algorithm, a functional algorithm, a parametric algorithm, a one-way function, or any method for correlating a first set of data with at least a second set of data now known or hereafter derived by those skilled in the art. In accordance with one exemplary embodiment, the matchable data structure correlates instructions specific to the CPU's instruction set with virtual CPU opcodes generated by the polymorphic engine; thus, the original opcodes are replaced with nonsensical random context instructions. The virtual CPU pre-processor, in accordance with another exemplary aspect, may function to further obscure polymorphed code by: (1) calculating the original opcode length; (2) using a matchable data structure to convert the original opcode into a random context instruction; and (3) placing the random context instruction code on the same line as the original code so that correlation with the original code is generally accomplished by determining the location of the random context code in the instruction code stream. In a further exemplary aspect, two matchable data structures may be used, wherein one data structure correlates the original CPU instructions with random numbers and the other data structure correlates the random numbers of the first data structure with random context instruction codes. In yet a further exemplary aspect of the present invention, a customized import table may be constructed from an original instruction code table whose contents are overwritten with erroneous information. Other methods, now known or hereafter derived in the art, may be used to correlate original CPU instructions with random context instruction codes in accordance with the present invention.

In yet another exemplary embodiment of the present invention, another layer of protection is provided by a call mutation feature that operates with the polymorphic engine to further impede attempts to analyze and reverse engineer application code. Many applications and/or operating systems use member calls to classes where the calls generally contain header data for the class member to function properly. Call mutation operates as a execution sequence redirector by: (1) overwriting the header of the original call with erroneous data, thereby effectively destroying the original call; (2) rerouting the original call to a substitute call in which the substitute routine queries the stack pointer to determine where the substitute routine has been called from; and (3) comparing the data obtained from the stack to, for example, a look-up table in order to pass program execution control to an appropriate routine. In one exemplary aspect, the overall function of the application is substantially the same, but the header of the original call is destroyed and not easily traced. This process can be iteratively applied to generate multiple layers of protection and may also be applied to pointers as well.

Figure 8:
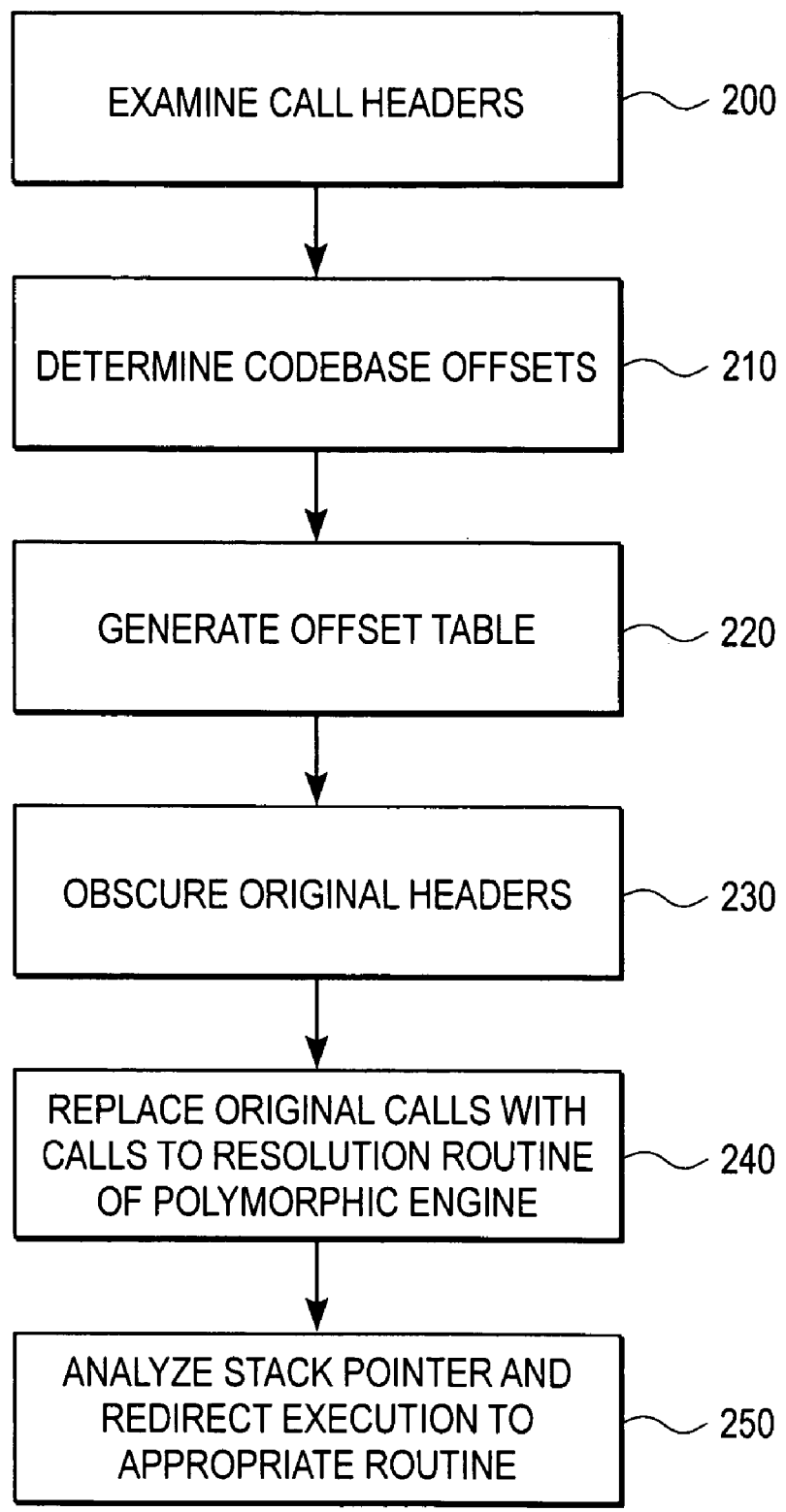
FIG. 8 is a schematic diagram depicting an exemplary system and method for the mutation of a subroutine call in accordance with another aspect of the present invention.

FIG. 8 depicts an exemplary application of the call mutation routine according to one exemplary embodiment of the present invention. The mutator looks at the information contained in the original header of a call (step 200) and then analyzes each line of code in the application to determine where the codebase offsets are (step 210) in the program that call the particular routine of interest. A table of offsets is then generated (step 220) for that particular call. When the operating system loads and initializes the polymorphed application 20, the overwritten headers of the original calls will contain erroneous information (step 230) and the original calls are replaced with calls to mutation resolution routines (step 240) of the polymorphic engine 15. The mutation resolution routine, according to an exemplary aspect, queries the program stack to determine the origin of the resolution routine. The stack value is then compared to a matchable data structure to determine which routine to pass program execution control to and the resolved routine is called with accurate header information (step 250) that may or may not be encrypted.

In a more specific exemplary embodiment, the call mutation routine scans polymorphed code for API calls such as, for example: CALL [API_NAME]; JMP [API_NAME]; MOV Register, [API_NAME]; etc. This data is used to generate an extended instruction pointer (EIP) table in which EIP's, as the offset from the base address, are correlated to API pointers, as shown in FIGS. 13 and 14.

Figure 13:
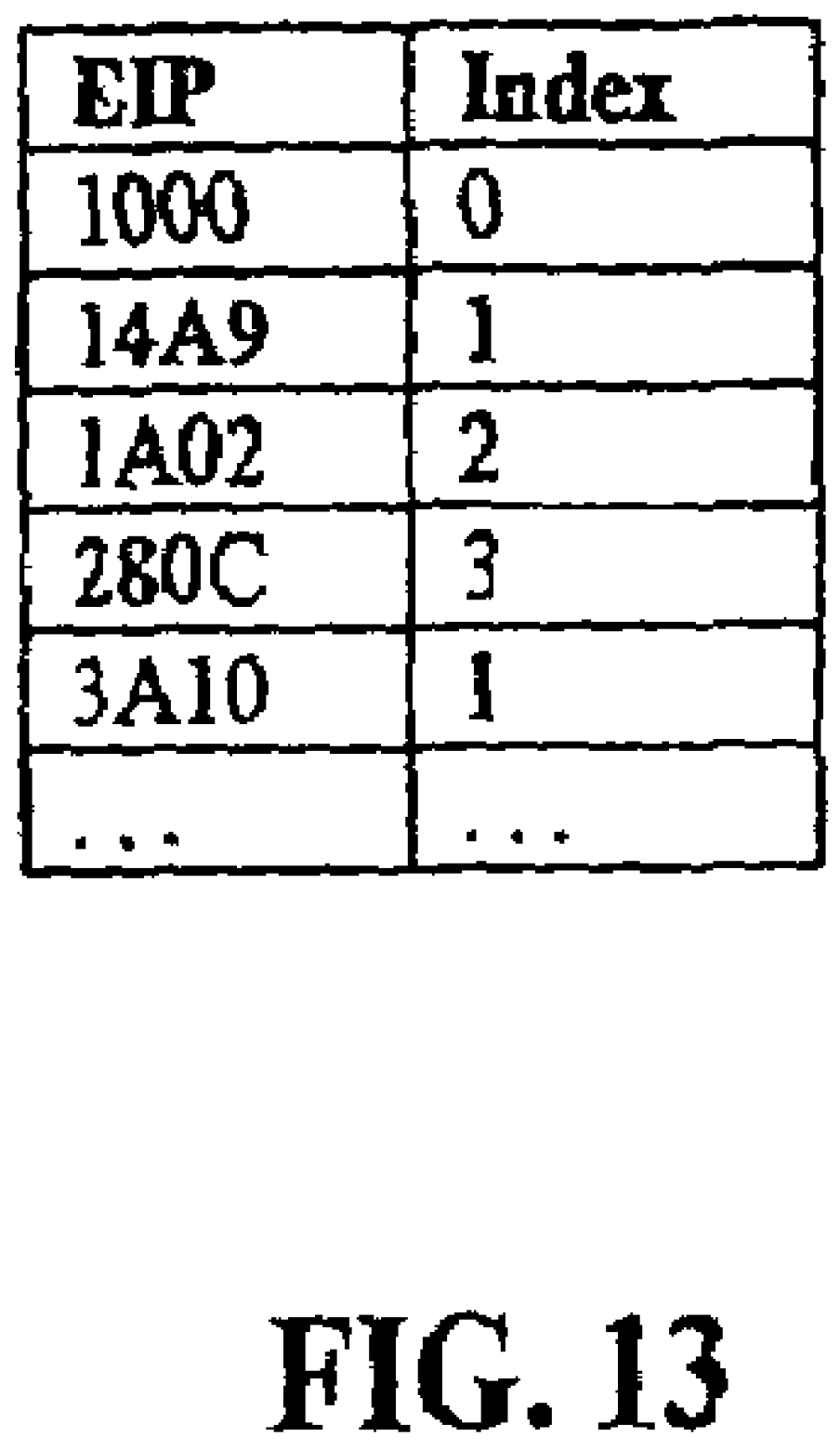

FIG. 13 depicts an EIP look-up table and FIG. 14 depicts an import address table having an indexed, encrypted list of the original API place holders. FIG. 15 shows how calls may be mutated in accordance with one exemplary embodiment of the present invention. Thereafter, occurrences of the original calls are replaced with calls to the polymorphic engine 15, as representatively shown in FIG. 16 for the INTEL.RTM. instruction set.

Decoding and resolution of the mutated calls may be accomplished, in one exemplary embodiment of the present invention, by (1) the polymorphic engine 15 obtaining the EIP for the particular calling line of code; (2) determining the destination address from the EIP look-up table, based on the EIP reference from the stack pointer; (3) correlating the AIP place holder in the import address table; (4) decrypting the AIP data; (5) conditioning the stack frame so that control is passed back to the line of instruction code immediately following the EIP on the stack; (6) determining if the program redirection is of the CALL or JMP type, and if so, performing a call to the original API; and (7) determining if the program redirection is instead of the MOV type, and if so, returning the original value in the appropriate register with minimal or no further execution of a call.

Figure 4:
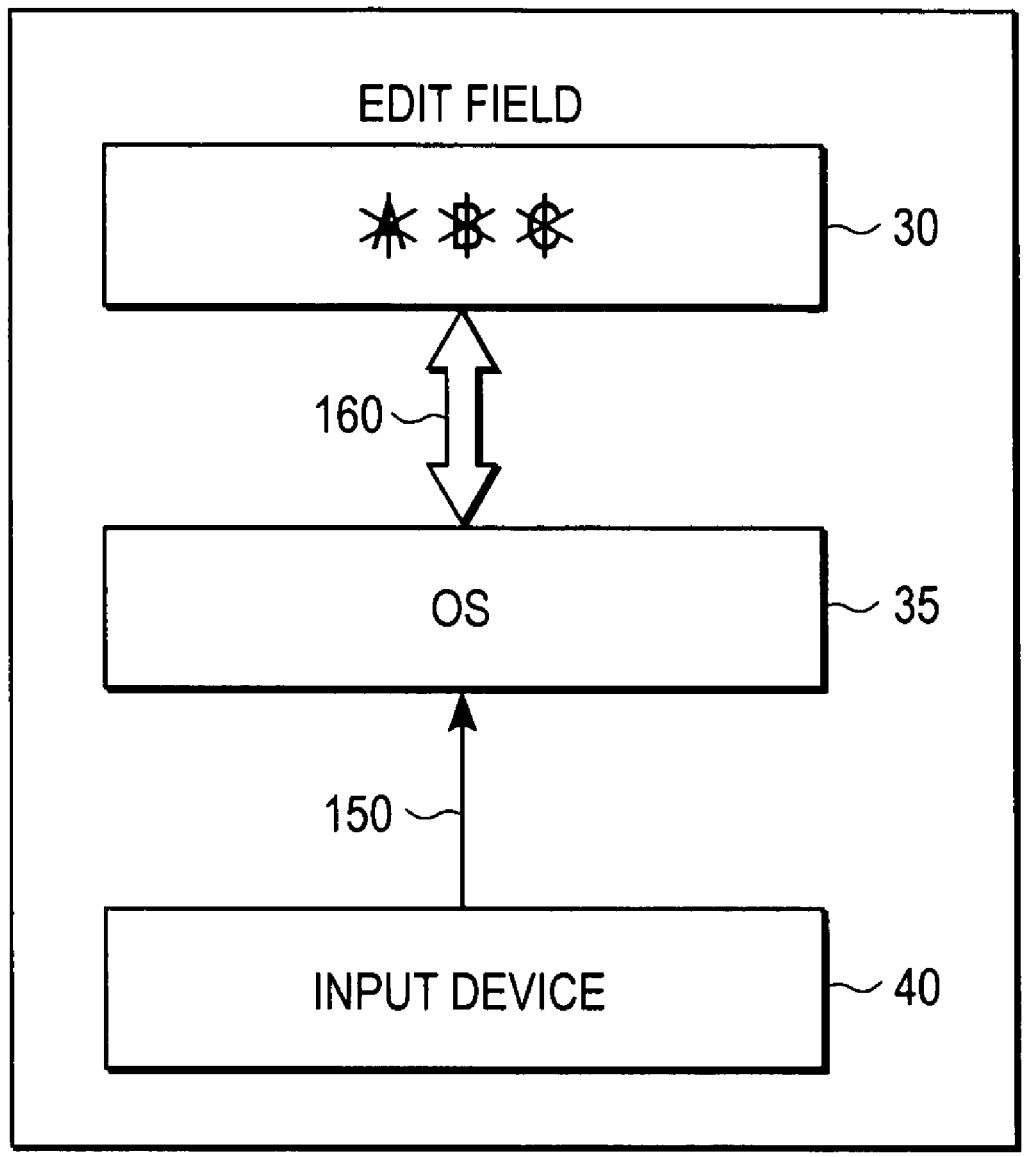
FIG. 4 is a schematic diagram depicting an exemplary prior art system and method for entering user input into a textbox data object.
Figure 5:
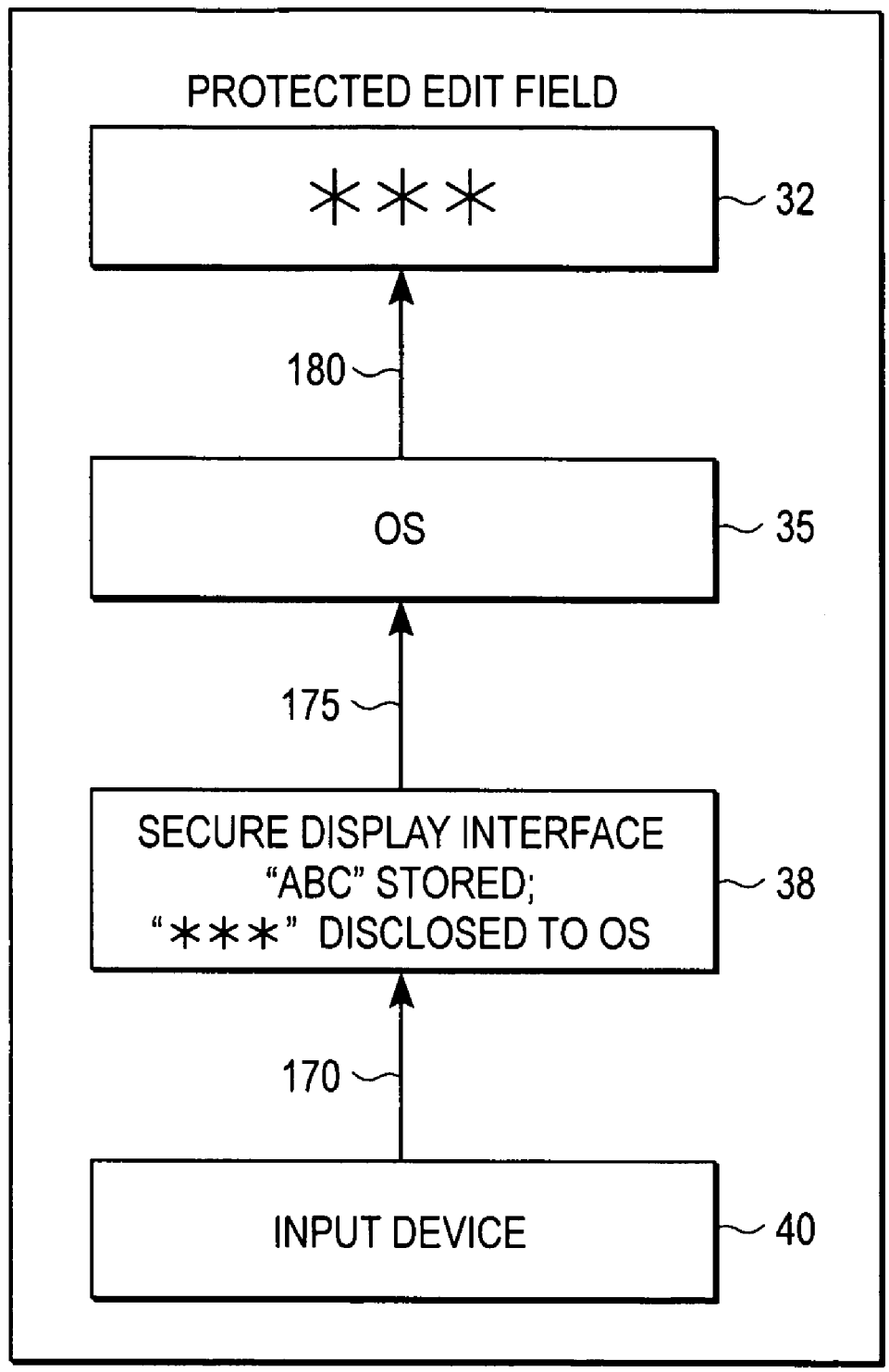
FIG. 5 is a schematic diagram depicting an exemplary system and method for securely entering user input into a textbox data object in accordance with another aspect of the present invention.

In yet another exemplary embodiment, a secure output display interface for concealing data may also be used to protect users from applications that may use operating system calls to capture data by placing a hook interface between OS routines and a hardware input device (i.e., from a keyboard, mouse, light pen, etc.). This is generally accomplished by capturing, interpreting and modifying device input before it is made available to other OS processes. FIG. 4 shows a prior art edit textbox 30 which bidirectionally communicates with the operating system 35 and may be directly interrogated to provide the original data from the input device 40 corresponding to the displayed textbox data which is concealed, in this example, by asterisk characters. FIG. 5, however, depicts a system and method in accordance with one embodiment of the present invention, in which the edit textbox 32 is protected from bidirectional communication with the operating system 35. This is generally accomplished with a secure hook-capture display interface 38 which receives data from an input device 40 and masks that data from the operating system 35.

The hook-captured input is enciphered and hidden from the OS 35. For example, a user password "ABC" to be entered into a textbox 32 can be hook-captured from, for example, the keyboard device driver, enciphered and stored, and then the hook routine passes literal asterisks characters "*" to the textbox 32. Queries from other OS routines to the textbox object 32 would return the series of asterisks characters "*" placed there by the hook routine and not the literal text "ABC" entered by the user. In one of the various exemplary aspects of the present invention, the hook-capture routine would help to secure user input to and/or from the polymorphed application 20 by modifying display device output as well as corresponding literal data object content.

Figure 6:
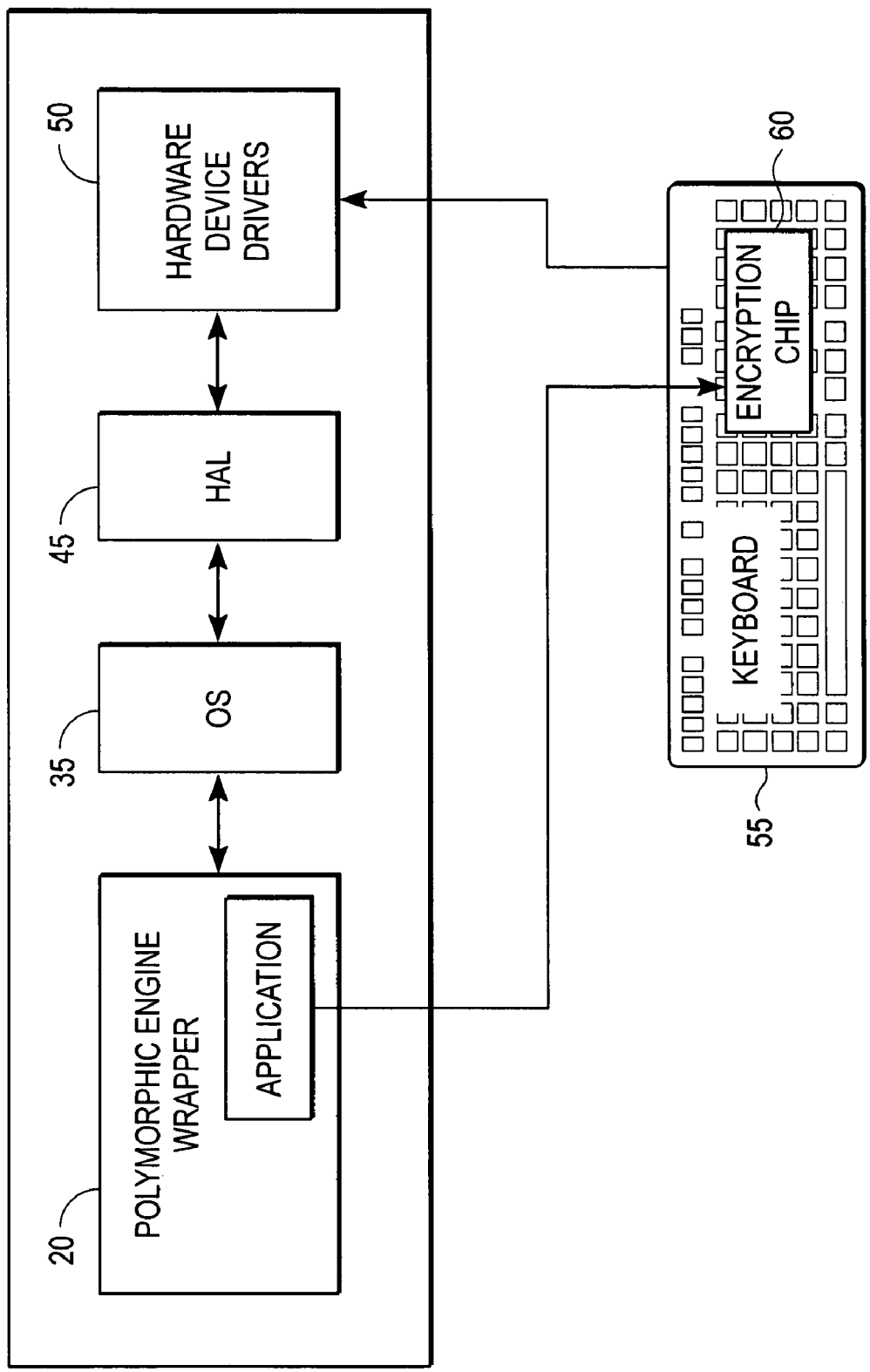
FIG. 6 is a schematic diagram depicting an exemplary system and method for securely communicating encrypted user input to an application in accordance with another aspect of the present invention.

FIG. 6 shows a security feature, in accordance with yet another exemplary embodiment of the present invention, that utilizes a secure hardware input device interface (i.e., keyboard, mouse, light pen, Ethernet cards, etc.) for entering secure data content. In one aspect of the present invention, the polymorphed application 20 communicates with an encryption chip 60 located within, for example, a keyboard 55 to tell the keyboard when encrypted communication is desired. All other communication with the keyboard 55, in absence of the request for encrypted data traffic, will be unencrypted. Encrypted data streams from the keyboard 55 are preferably decrypted at the polymorphed code application level 20, not the device driver 50, hardware abstraction layer 45 or OS 35 levels, in order to prevent background applications from obtaining the decrypted data stream. In a preferred exemplary embodiment, the input device encryption chip 60 would only ever be signaled to use encrypted data traffic when the polymorphed application 20 is brought into use focus.

Figure 7:
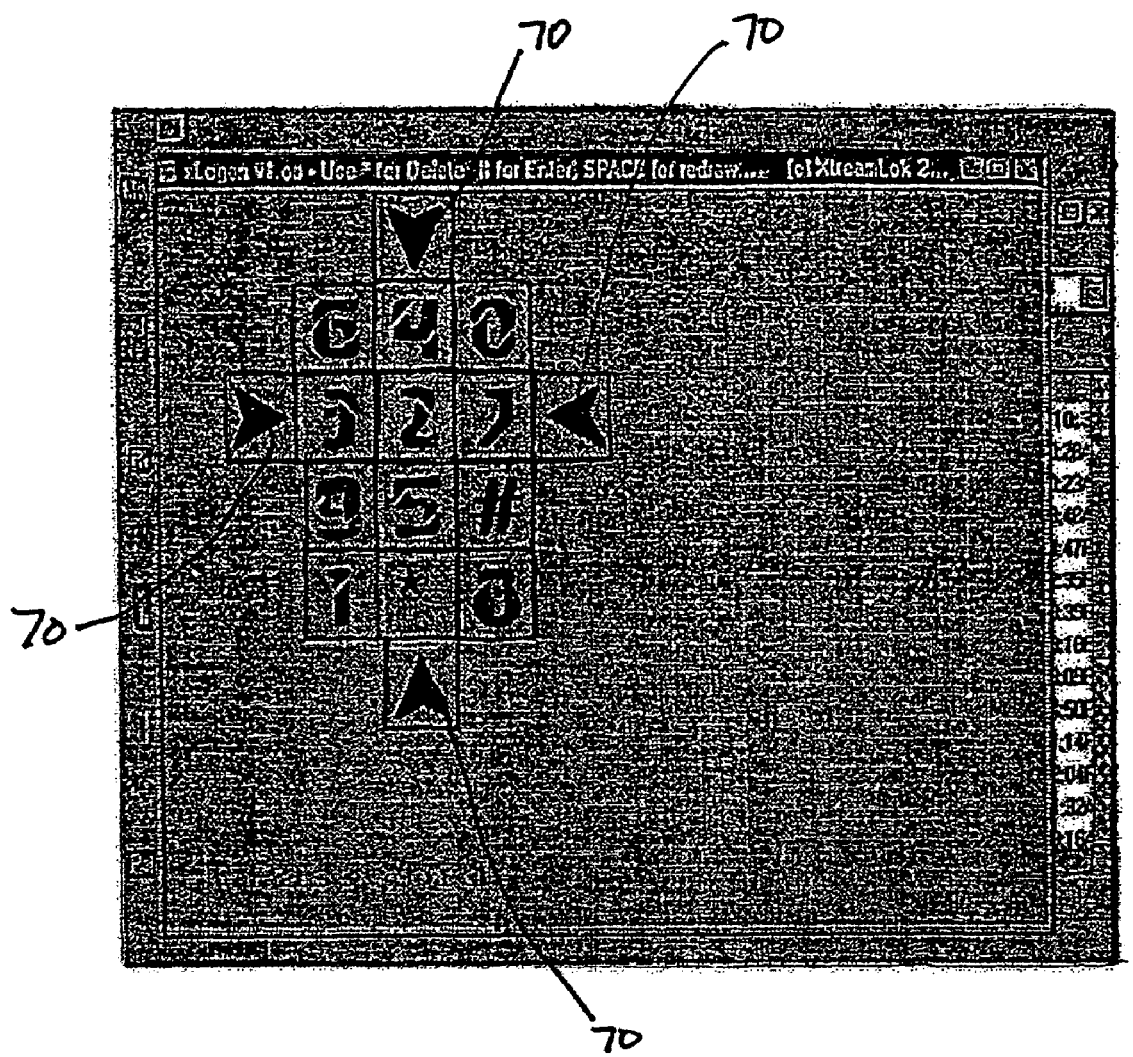
FIG. 7 is a display screen-shot depicting an exemplary system and method for securely entering user input that is designed to frustrate attempts to optically capture and/or device log input data in accordance with another aspect of the present invention.

FIG. 7 shows yet another embodiment of the present invention in which a secure software application for entering, for example, authentication information (i.e., username and password data, etc.) is depicted. The application is a dynamic, randomly configured, graphical keypad display, which is designed to subvert optical capture/recognition and hardware input device logging. In one exemplary embodiment of the present invention, the graphical keypad comprises standard numbered keys, a delete key and an enter key which are randomly arranged in the keypad matrix. In addition to the keypad, there are four cursor keys 70. As the graphical keypad is initialized, a random keypad position is selected and highlighted. The four cursor keys permit the user to reposition the highlight over the key to be entered. When the highlighting cursor is positioned over a key, the display flashes the value corresponding to the highlighted key and then quickly obscures the key value. When the enter key has been depressed, the keypad display is cleared and the highlighting cursor is again randomly repositioned on the keypad. The dynamic display features subvert display screen-shot attempts to determine the key that has been depressed, while the random reconfiguration of the keypad for each keypad entry also subverts keyboard logging attempts. Such a graphical keypad application may be used, for example, to improve the security of data entered into an executing polymorphed application in accordance with an exemplary embodiment of the present invention.

FIG. 9 depicts a layered security diagram for securely executing application code in accordance with yet another exemplary embodiment of the present invention. In the top most layer, a checksum is calculated with modification of any deeper layer resulting in an invalid checksum being calculated (step 315). In the next layer, the polymorphic decryption engine is started using running line encryption with modification of any deeper or higher layer causing the decryption to fail (step 314). In the next layer, validation of the checksum is calculated from step 315 with any modification causing a checksum error (step 313). The next lower layer erases the previous block, destroying higher layers in memory and making rebuilding very tedious (step 312). Thereafter, an internal import table is populated with values while the import table references in the executable code are obscured; tampering with this layer will cause the executable to not work (step 311). In the next layer, running line is started with a CRC, erasure of the previous block, and decoding of the next block with a CRC key; a single byte change in a deeper or higher layer causes the destruction of the next block of data (step 310). The next layer decrypts sections of the running line with the running line being based on the executable code's CRC; modification of any deeper or higher layer will cause invalid data production (step 309). In the next layer, a CRC of, for example, a portable executable (PE) header is performed with storage of the CRC for checking at a lower security level (step 308). The PE header is the data block which enables the WINDOWS.RTM. OS to correctly load and execute a WIN32 executable. The next layer installs timer code designed to trigger a CRC check (step 307). In the next layer, an import table is created using the layer at step 311 to determine the actual import table to be used (step 306). The next lower layer of security decrypts resource sections with the decryption based on all layers both above and below; any change will result in invalid data being produced (step 305). In the next layer, the previous instruction is erased and the next instruction is decrypted with deletion of parts of the executable code occurring as each block is decrypted, making a full rebuild very difficult (step 304). In the next layer, the code entry point is decoded and program execution jumps to the entry point with decryption of the original entry point of the program based on all above layers. Also at this level, execution of the original program is initialized (step 303). In the next layer of security, a check is made for breakpoints on each API call made with deletion of hardware breakpoints to defeat debugging attempts (step 302). In the bottom layer, a verification of non-modification is performed every 'n' seconds to check for debugging attempts by comparing memory CRC's with disk CRC's from the layer at step 315 (step 301).

In a further representative aspect of the present invention, layered security methods, such as, for example, the described exemplary embodiment in accordance with steps 315-301, may be used to detect, for example, the presence and/or operation of a computer virus. Moreover, it will be apparent to those skilled in the art that while each security layer (steps 315-301) may individually provide suitable protection for the execution of a computer application, the combination of security layers, and the interoperability of the component features of the same, offers substantial benefits with respect to the discrete implementation of any single component security feature by itself.

Figure 17:
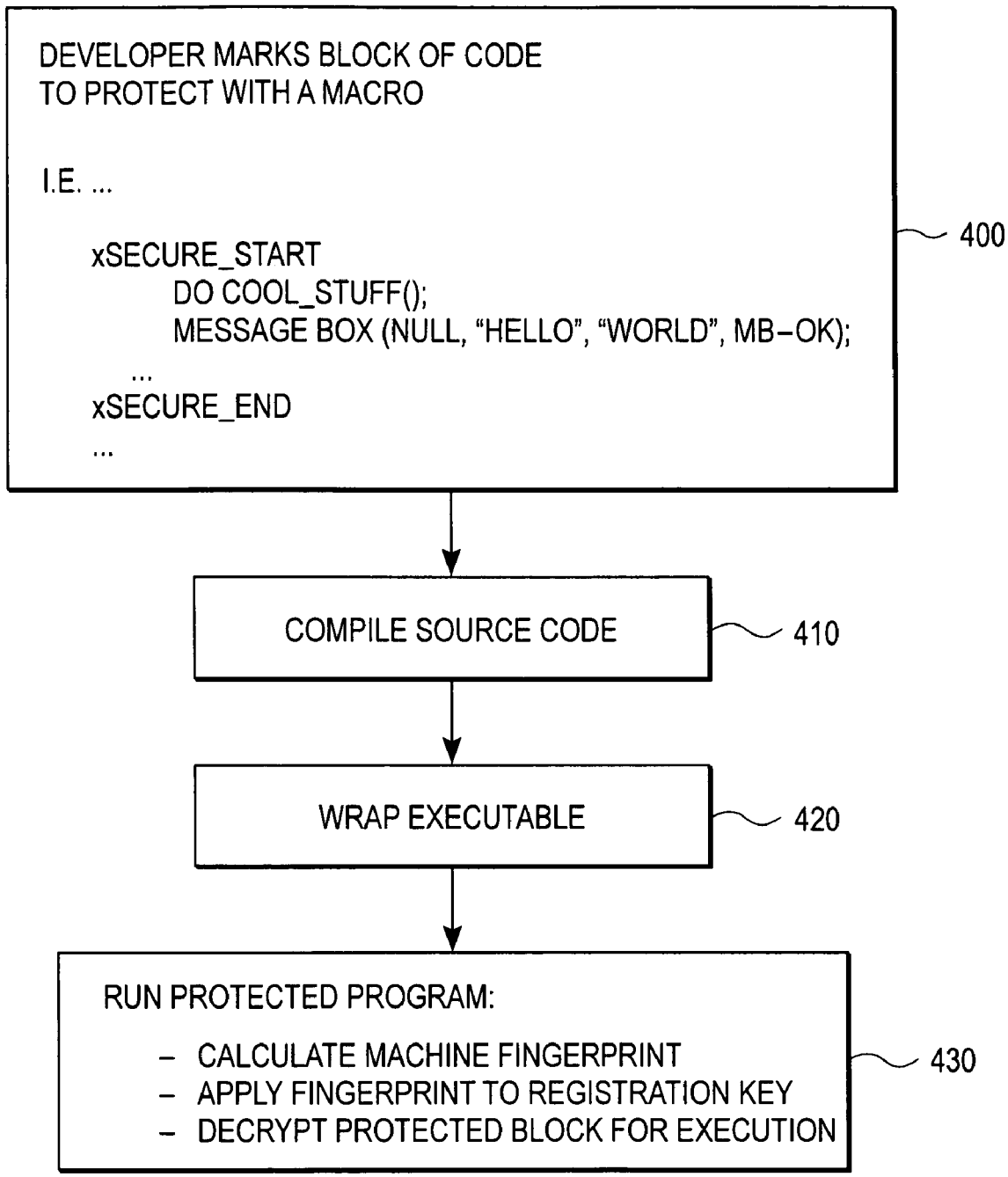
FIG. 17 is a schematic diagram depicting an exemplary system and method for protecting provisional use software in accordance with another aspect of the present invention.

FIG. 17 depicts yet another exemplary embodiment of the present invention. Often, copies of software applications may be distributed for provisional use in anticipation of provisional end-user testing of the software to determine whether a license will be purchased. Generally, software may be distributed in a restricted or crippled format, for example, by not permitting a provisional user to save or print a document created with the provisional version of the application. Other restrictive methods may render the provisional software application entirely unusable after the expiration of a given period of time.

An exemplary application of the security features of the present invention described herein, is directed to a "try-before-you-buy" implementation. Generally, this may be accomplished, in one representative aspect, by allowing the software developer to insert a macro or marker into the original source code 400 (Step "xSecure_Start . . . xSecure_End") which instructs the polymorphic engine 15 wrapper to encrypt the designated code block (Step "DO Cool_Stuff( ) . . . ") to avoid execution without a valid key. The source code 400 is then compiled to produce executable code 410. During polymorphic wrapping 420, an encryption method is selected which is suitably adapted such that brute force decryption attempts would generally not be practicable with industry standard equipment. When the protected application is formally licensed and/or registered ("read purchased"), a key is supplied to the user which is mathematically customized to the signature of the application's operating environment. A "fingerprint" key may be constructed as a function of, for example, software/hardware system component information, network connectivity data, user identification data, CPU serial numbers, etc. or any other information now known or hereafter derived by those skilled in the art. The key is combined with a calculated fingerprint signature, and the protected code block decrypted using the resulting combination 430. If the application is ported to a different machine, or executed without a valid key, the decryption will fail and, for example, a warning may be displayed indicating that the software is operating in a demonstration or trial-use mode.

Figure 18:
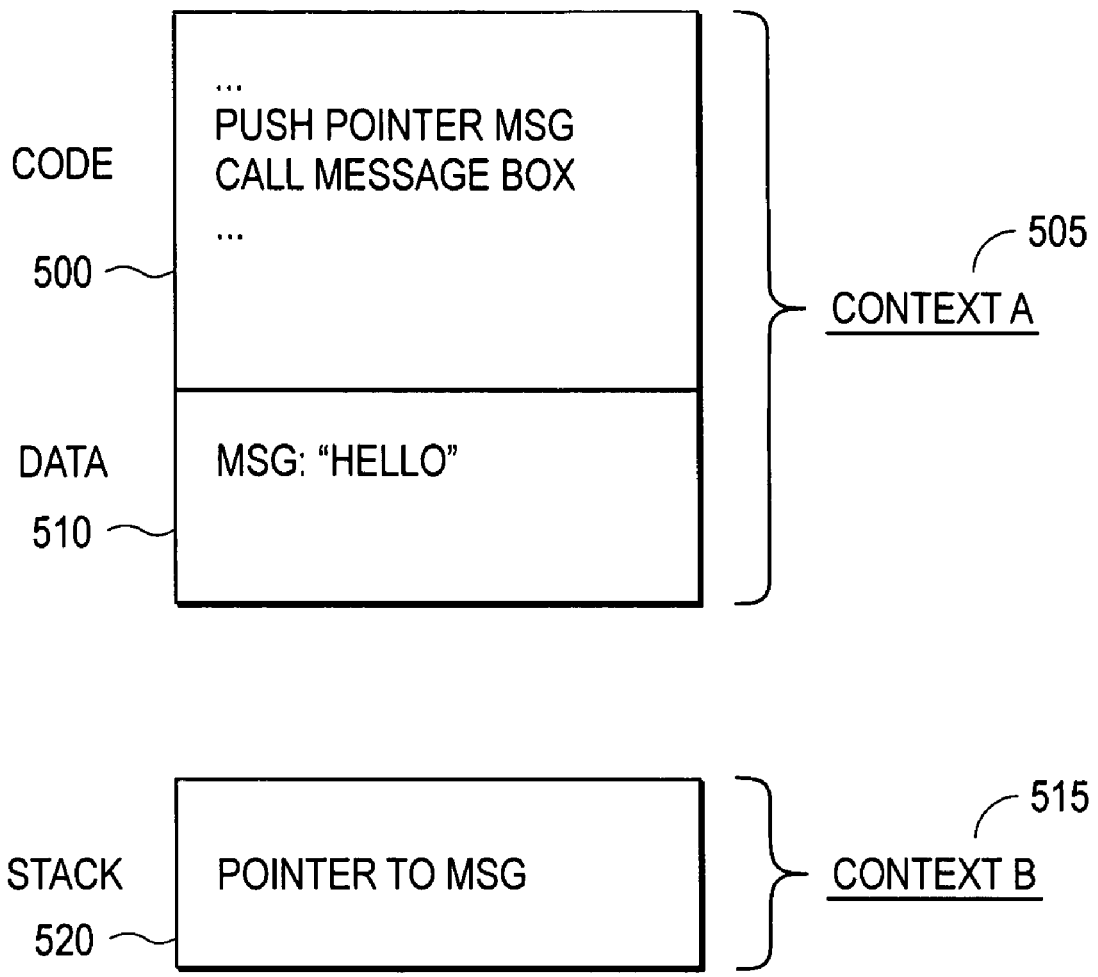
FIG. 18 is an exemplary schematic diagram depicting prior art relationships between application code, application data and the program stack.
Figure 19:
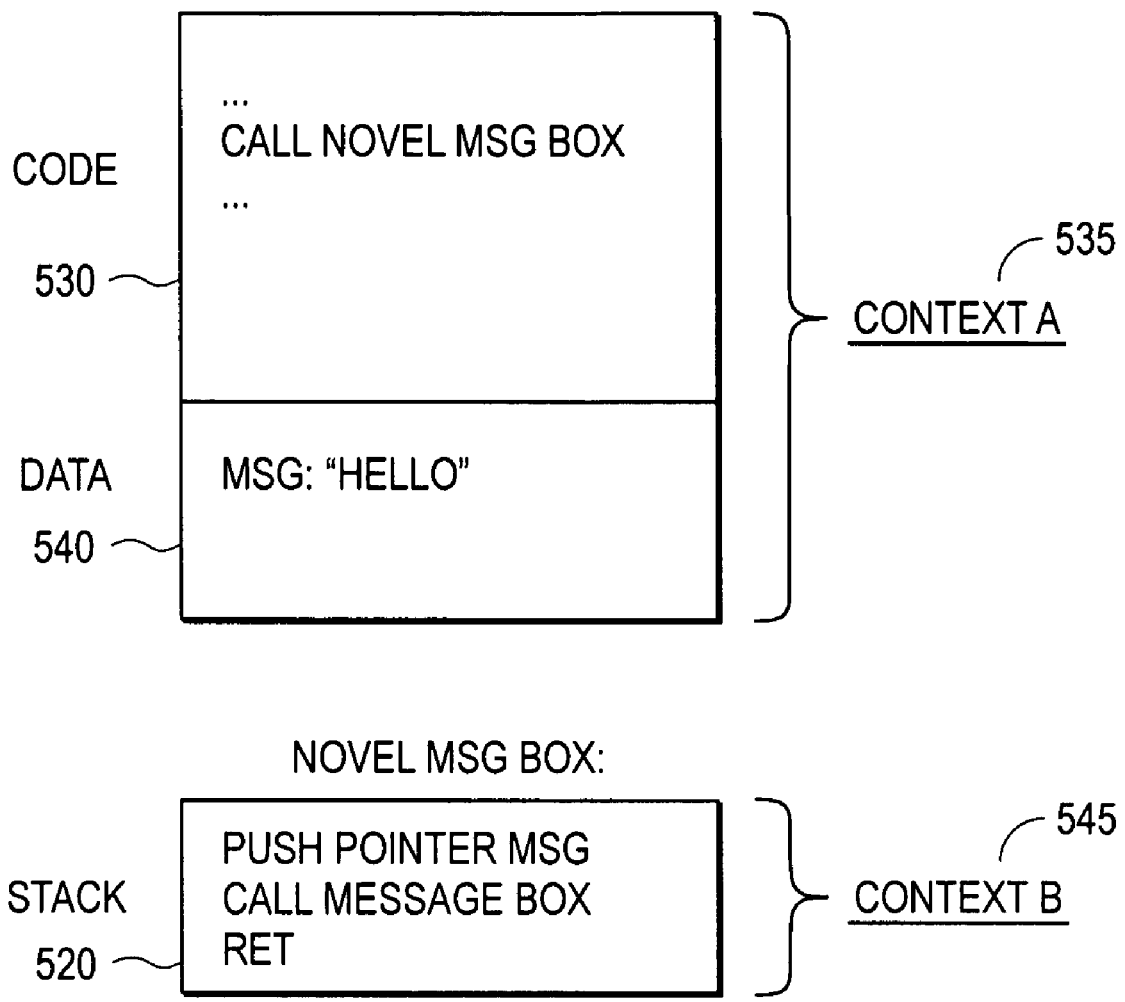
FIG. 19 is a schematic diagram depicting an exemplary system and method for manipulation of the program stack in accordance with another aspect of the present invention.

In another exemplary aspect of an embodiment of the present invention, the program stack may be manipulated to further subvert attempts to reverse engineer application code. FIG. 18 generally depicts generic prior art relationships existing between application code 500, application data 510 and the program stack 520. FIG. 19, however, shows an exemplary embodiment of the present invention having different relationships among these same components: application code 530, application data 540 and the program stack 550. A first context ("Context A", see 505 and 535) is generally comprised of the application code and the application data in both the prior art embodiment and the present exemplary inventive embodiment. Additionally, a second context ("Context B", see 515 and 545) is generally comprised of the program stack in the prior art embodiment and the exemplary inventive embodiment as well. One difference between the prior art and the present exemplary inventive embodiment, however, involves what happens when a memory dump or memory snap-shot occurs in an attempt to address and/or reverse engineer the code.

In the prior art embodiment, interrogation of memory will generally produce only the information corresponding to Context A 505, but the information of Context B 515 is contained in the data of Context A 505 by virtue of the "PUSH POINTER MSG" instruction (See 500). Therefore, the prior art code is susceptible to reverse engineering. In accordance with one aspect of the present exemplary embodiment, when a memory interrogation of Context A 535 occurs, substantially all information contained in Context B 545 is lost in such a fashion that the information generally cannot be regenerated from the contents of Context A 535. This occurs because the polymorph wrap process dynamically replaces the original code with a new call which is written directly to the stack. In other words, the call to the unwrapping code of the polymorphic wrapper application 15 is placed on the stack and generally never in the code of the protected application itself. The code on the stack 550, therefore, is generated in situ and concurrent with the removal of the original code. In another exemplary embodiment of the present invention, the original code may or may not be encrypted. In yet another exemplary embodiment of the present invention, the system and method depicted in FIG. 19 may also be used for API call redirection as well.

In still other exemplary embodiments, the system of the present invention may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including data that could be used in association with the present invention. The database may be any type of database, such as relational, hierarchical, object-oriented, and/or the like. Common database products that may be used to implement the database include DB2 by IBM (White Plains, N.Y.), any of the database products available from ORACLE.RTM. CORPORATION (Redwood Shores, Calif.), MICROSOFT.RTM. ACCESS by MICROSOFT.RTM. CORPORATION (Redmond, Wash.), or any other database product. The database may be organized in any suitable manner, including, for example, data tables, look-up tables or any matchable data structures now known or hereafter derived in the art.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field". A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, matchable data structures, and the like, which may carry out a variety of functions under the control of one or more microprocessors or other control devices. Similarly, the software elements of the present invention may be implemented with any programming or scripting language such as, for example, C, C++, Java, COBOL, assembler, PERL, eXtensible Markup Language (XML), etc., or any programming or scripting language now known or hereafter derived in the art, with the various algorithms being implemented with any combination of data structures, objects, processes, routines or other programming elements. Further, it should be noted that the present invention may employ any number of conventional techniques for data transmission, signalling, data processing, network control, and the like. Still further, the invention could be used to detect or prevent security issues with a client-side scripting language, such as JavaScript, VBScript or the like. For a basic introduction of cryptography, please review a text written by Bruce Schneider entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

It will be appreciated, that many applications of the present invention could be formulated. One skilled in the art will appreciate that the network may include any system for exchanging data, such as, for example, the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot.RTM.), cellular phone and/or the like. Similarly, the invention could be used in conjunction with any type of personal computer, network computer, workstation, minicomputer, network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

As will be appreciated by one of ordinary skill in the art, the present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication is accomplished through any suitable communication means, such as, for example, a telephone network, Intranet, Internet, point of interaction device (point of sale device, personal digital assistant, cellular phone, kiosk, etc.); online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by merely the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical". Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing or design parameters or other operating requirements without departing from the general principles of the same.

We claim:

1. A computer system for modifying compiled code of an application while substantially preserving operational and functional characteristics thereof, the computer system comprising:
    a processor;
    means, executable by the processor, for providing the compiled code;
    means, executable by the processor, for detecting a program execution jump in the compiled code that requires header data for execution;
    means, executable by the processor, for overwriting the header data and generating overwritten header data to prevent the program execution jump;
    means, executable by the processor, for redirecting program execution to a resolution subroutine; and
    correlation means, executable by the processor, for enabling the resolution subroutine to execute a program jump to an appropriate codebase with the overwritten header data.

2. A computer-implemented method of modifying compiled code of an application while substantially preserving operational and functional characteristics thereof comprising:
    using a computer processor configured to execute method steps, the steps comprising:
        detecting a program execution jump in the compiled code that requires header data for execution;
        overwriting the header data and generating overwritten header data to prevent the program execution jump;
        redirecting program execution; and
        executing a program jump to an appropriate codebase with the overwritten header data.

3. The method of claim 2, wherein said redirecting is accomplished by correlating EIP data with API placeholder data.

4. The method of claim 3, wherein the API placeholder data is encrypted.

5. A computer-implemented method of securely executing compiled code of an application while substantially preserving operational and functional characteristics thereof, the computer-implemented method comprising:
    providing a platform having a CPU, said CPU having a program stack;
    providing compiled code;
    replacing dynamically at least a first call and a first plurality of instructions in the compiled code with a second call to a second plurality of instructions, wherein the second plurality of instructions is written substantially directly to the program stack, and wherein the second plurality of instructions substantially replicates the function of the first plurality of instructions; and
    removing the first call from the compiled code.

6. The method of claim 5, wherein either or both of the first call and the second call are encrypted.

7. The method of claim 5, wherein the first call is an API call.

8. The method of claim 5 wherein the second plurality of instructions is a polymorphic variant of the first plurality of instructions.

9. The method of claim 5, further comprising removing the first plurality of instructions from the compiled code.

10. The method of claim 5, wherein a polymorphic wrap process dynamically replaces the first call and the first set of instructions with the second call to the second plurality of instructions.

11. The method of claim 2, wherein the overwritten header data generated is erroneous data that destroys an original call associated with the program execution jump without destroying program function.

12. The method of claim 2, wherein redirecting program execution further comprises rerouting an original call to a substitute call comprising a resolution subroutine of a polymorphic engine that queries a stack pointer of a program stack for the application to determine from where the substitute call originated.

13. The method of claim 12, further comprising comparing data obtained from the stack pointer to a matchable data structure to pass program execution control an appropriate routine specified by the header data originally present before overwriting, wherein the appropriate routine is called using the original header data.

* * * * *